P. C. St. MARIE.
CAPSTAN AND WINDLASS.

No. 176,561. Patented April 25, 1876.

Attest:
C. J. Frith
Edith Brookes

Inventor:
Pierre Celestin St. Marie
by Colborne Brookes
Att'y.

4 Sheets—Sheet 2.

P. C. St. MARIE.
CAPSTAN AND WINDLASS.

No. 176,561. Patented April 25, 1876.

Attest:
C. T. Tite
Edith Brookes

Inventor:
Pierre Celestin St. Marie
by Colborne Brookes
Att'y.

N. PETERS, PHOTO-LITHOGRAPHER, WASHINGTON, D. C.

4 Sheets—Sheet 3.

P. C. St. MARIE.
CAPSTAN AND WINDLASS.

No. 176,561. Patented April 25, 1876.

Attest:
C. J. Fritz
Edith Brookes

Inventor:
Pierre Celestin St. Marie
by Colborne Brookes
Att'y

P. C. St. MARIE.
CAPSTAN AND WINDLASS.

No. 176,561. Patented April 25, 1876.

4 Sheets—Sheet 4

Attest:
C. J. Orill
Edith Brookes

Inventor:
Pierre Celestin St. Marie
by Colborne Brookes
Att'y.

N. PETERS, PHOTO-LITHOGRAPHER, WASHINGTON, D C.

UNITED STATES PATENT OFFICE.

PIERRE CELESTIN ST. MARIE, OF MONTREAL, CANADA.

IMPROVEMENT IN CAPSTANS AND WINDLASSES.

Specification forming part of Letters Patent No. 176,561, dated April 25, 1876; application filed April 17, 1876.

*To all whom it may concern:*

Be it known that I, PIERRE CELESTIN ST. MARIE, of the city and district of Montreal, in the Province of Quebec and Dominion of Canada, engineer, have invented certain new and useful Improvements in Apparatus for Raising and Lowering Anchors, &c.; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to improvements in apparatus for raising and lowering anchors and other weights, the nature of which will be fully explained by reference to the accompanying drawings, in which—

Figure 1:
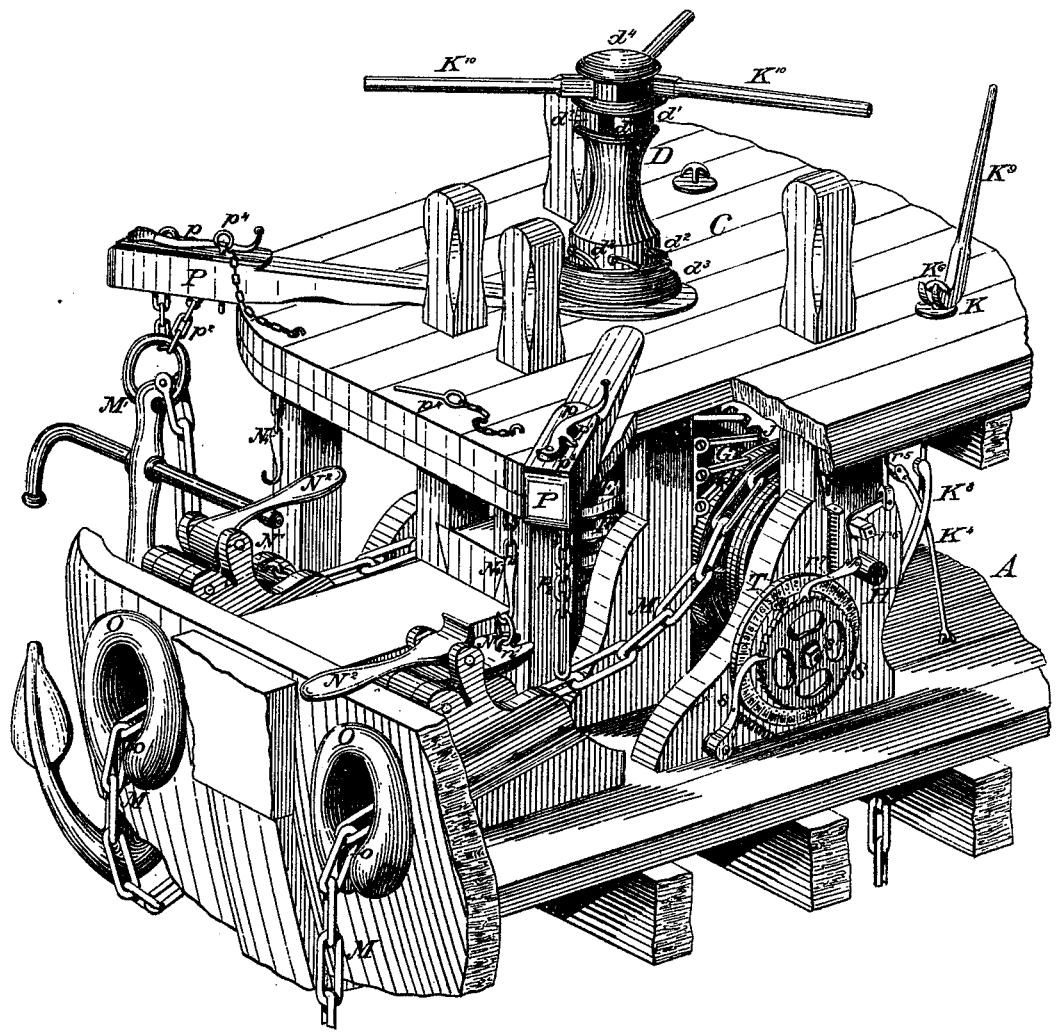
Figure 3:
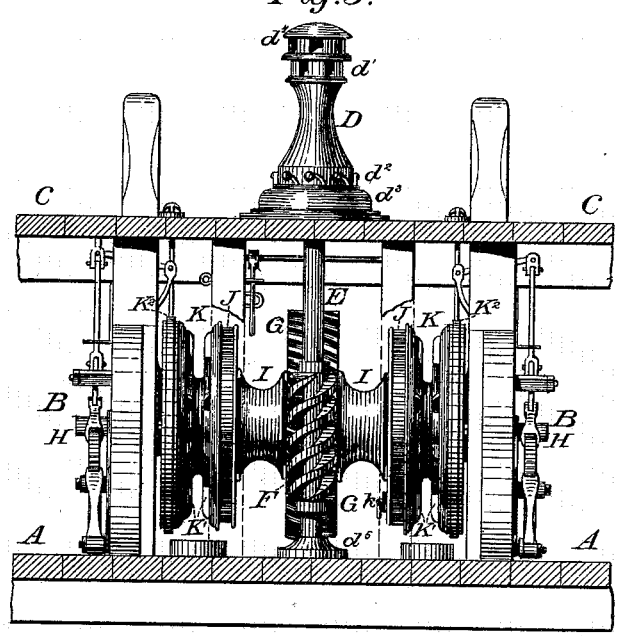
Figure 2:
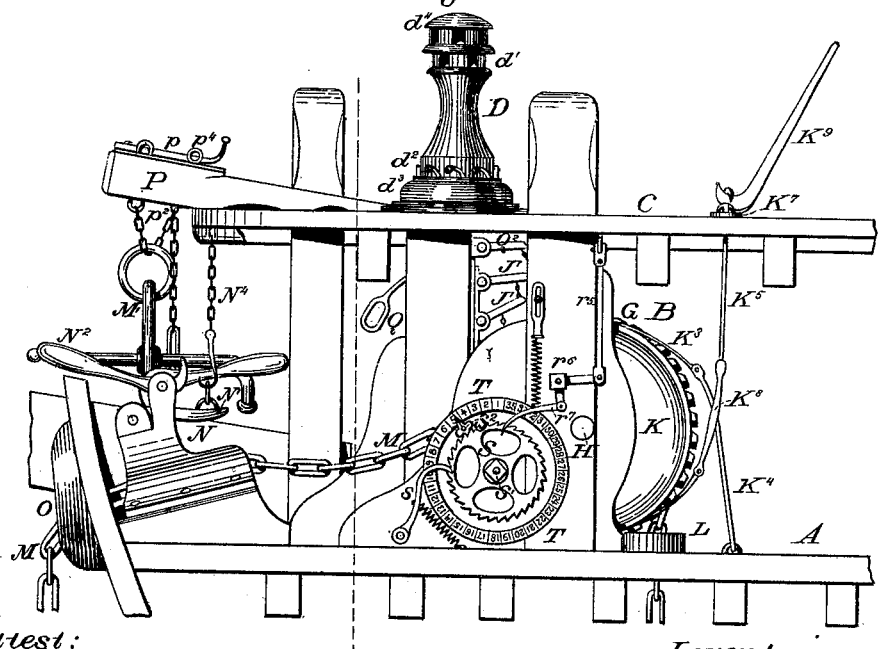
Figure 4:
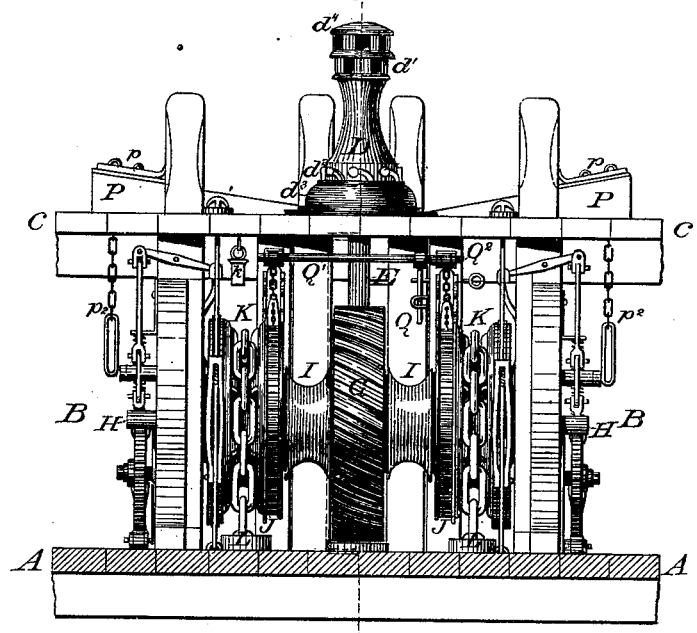
Figure 5:
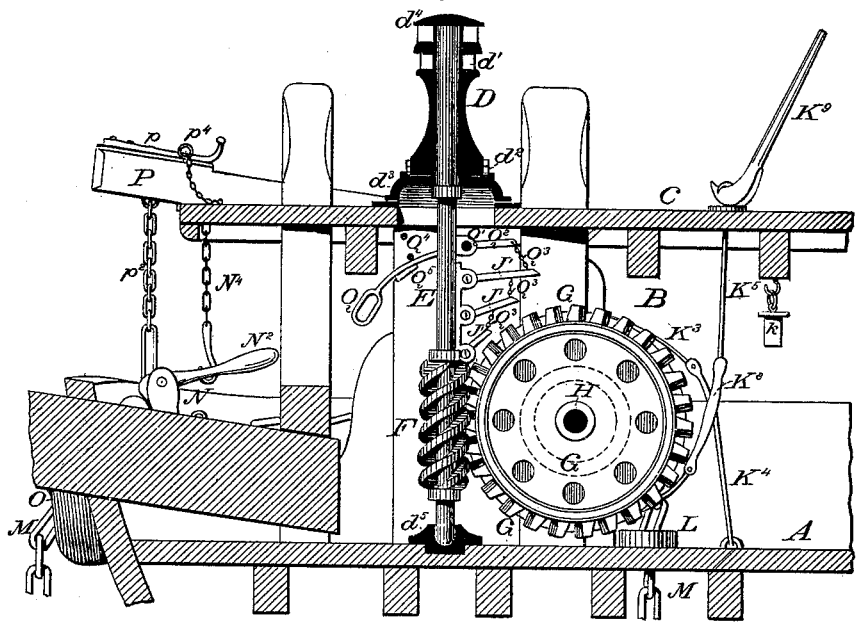
Figure 6:
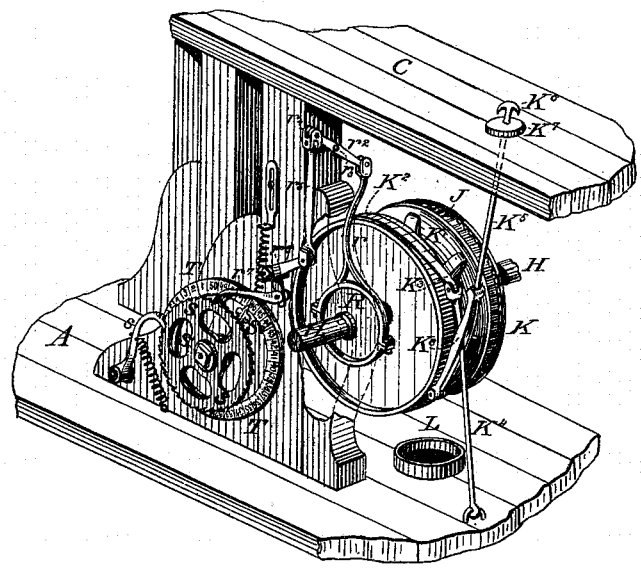

Figure 1 represents a perspective view, Fig. 2 a side view, Fig. 3 a back view, Fig. 4 a front view, and Fig. 5 a horizontal section, of so much of a ship or vessel, with my improvements applied thereto, as will serve to illustrate my invention. Figs. 6, 7, 8, and 9, show detail views of parts separately.

In each of the views, similar letters of reference are employed to indicate corresponding parts wherever they occur.

A represents a portion of the main deck of a ship or vessel, upon which is erected the windlass B and the various devices necessary for controlling and operating the same, and the necessary chains, cables, or ropes, as hereinafter more fully described. C represents part of the forecastle-deck, upon which is mounted the capstan D, which works independently on the vertical shaft E. The capstan D is of ordinary construction, and provided with a head, $d^1$, pawls $d^2$, and pawl-base $d^3$, bolted to the forecastle-deck C. On the upper end of the shaft E, and immediately above the head $d^1$, is mounted the drum-head $d^4$, which is secured to the shaft E by a key or other suitable means. The shaft E, at its lower end, is supported with capability of revolving freely in the socket-plate or bearing $d^5$, bolted to the main deck A. F is an endless screw, formed on or affixed to the shaft E, and gearing with the worm-wheel or pinion G, mounted on the windlass-shaft H. Upon the shaft H, on each side of the worm-wheel G, is arranged a barrel-wheel, I, for the purpose of coiling ropes thereon, in order to heave up masts or other heavy weights, and also a pawl-wheel, J, and a wild-cat-head wheel, K, (or a chain or grab wheel.) The cat-head wheels K are connected to the pawl-wheels J by means of locks or keys $k$, (one of which is shown separately at Fig. 8,) and which are hung to the forecastle-deck when not in use. The cat-head wheels K are each provided with a grooved flange, $K^1$, in which works a friction-band, $K^2$, the upper end, $K^3$, of which is connected to a rod, $K^4$, hooked to the main deck A, while the opposite end is pivoted to a hasp, $K^8$, which is raised and lowered by means of the screw-rod $K^5$, passing through the forecastle-deck C, and terminating in a double hook, $K^6$, which rests on a washer or bearing-plate, $K^7$.

The bands $K^2$ may be tightened, when desired, by simply turning the screw-rods $K^5$. The rods $K^5$ are raised and lowered for the purpose of breaking the cat-head wheels K, by means of a heeled clawed handspike, $K^9$. (Shown separately at Fig. 9, and in position at Figs. 2 and 5.)

L L represent a pair of deck barrel hawser-pipes, through which the anchor-chains M are conducted into the chain-locker. N N are chain-stoppers, having hinged plates $N^1$ and a cam-lever, $N^2$, pivoted to lugs, in order to press the plates $N^1$ upon the anchor-chains, in order more effectually to stop the same. The plates $N^1$ at their ends are provided with a notch or recess, $n$, for the reception of the cross-links of the chain M when sliding in the groove of the chain-stopper N. When the chains are being paid out the plates $N^1$ are held up out of position by means of chains $N^4$ from the forecastle-deck. O O are chain-hawser pipes, which are provided with grooves $o$ $o$, thereby allowing the anchor-chains M to slip through the same without twisting. P P are davits, provided with an anchor-hanger-chain lever, $p$, pivoted to their heads.

The levers $p$ are provided with a lug or catch, $p^1$, which passes through the end link of the anchor-hanging chains $p^2$, which passes through the slot $p^3$, and holds up the anchor $M^1$, as shown by Figs. 1 and 2.

The levers $p$ are locked in position by means of a pin, $p^4$.

Q is a lever-arm mounted on a shaft, $Q^1$, to which are also attached a pair of arms. $Q^2 Q^2$, to the outer end of which, by means of a series of chains, $Q^3$, are connected the pawls $J'$, which mesh into the pawl-wheels J.

Figure 7:
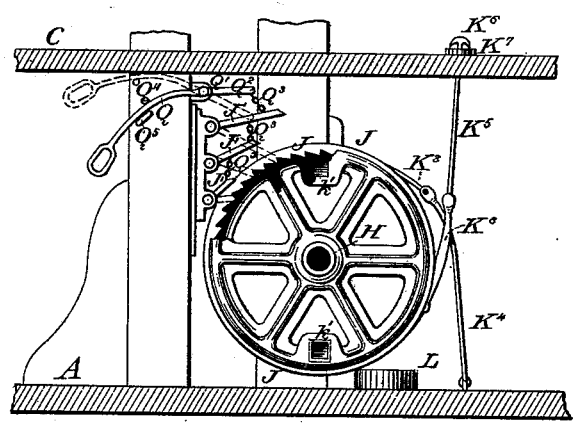

By lowering the end of the lever Q, as shown by full lines in Fig. 7, all the pawls $J'$ will be simultaneously raised from the position shown by dotted lines, and disconnected from the pawl-wheels J, thereby allowing of the motion of the windlass B being reversed. $Q^5$ is a stop to prevent the lever Q being depressed too far. The lever Q is held in place either up or down by means of a pin, $Q^4$. R is an eccentric mounted on the outside of and within the countersunk portion of the wild-cat-head wheels K, the rod $r$ of which is pivoted to one end of a lever-arm, $r^2$, supported on an axis, $r^3$, while its opposite end, $r^4$, is pivoted to the upper end of a pitman, $r^5$, the lower end of which is connected to one arm of an L-shaped lever, $r^6$, to the opposite arm of which is pivoted the clawker or driver $r^7$, which takes into the teeth of the ratchet-wheel S, mounted on an axis, $S^1$. $s$ is a retaining-pawl to prevent the backward movement of the ratchet-wheel S. T is a graduated dial, each division representing a fathom or other suitable length of chain.

The ratchet-wheel S is provided with an indicator or hand, $S^2$, which travels with the same and shows the number of fathoms of chain paid out or drawn in in casting or heaving the anchor.

I arrange a dial and working mechanism at each end of the windless B, one working to the right and the other to the left hand, thus enabling a sailor or other person standing by either of the dials to see the amount of chain paid out and to give the order to check at any time desired.

In order to cast either one or two anchors of a ship, the plate $N^1$ of the chain-stoppers N is raised and hooked up, as shown by Figs. 1 and 2.

Figure 8:
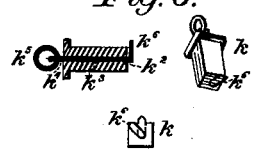
Figure 9:
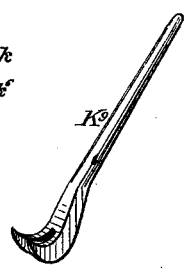

The wild-cat-head wheels K are unlocked by drawing out the pins or locking-pieces $k$, shown separately by Fig. 8, which are then suspended ready for future use, as shown by Fig. 5; the anchor is then cast loose, which pays out by its own weight the chain to which it is attached.

The pins or locking-pieces $k$ are by preference formed square, although they may be of other forms, and are provided with central bearing $k^2$, through which pass shafts $k^3$, on one end of which are formed eyes or loops, $k^4$, adapted to receive rings or loops $k^5$. At their opposite ends the shafts $k^2$ are provided with short arms $k^6$, so constructed and arranged that when it is desired to insert the pins or locking-pieces $k$ into the holes $k^1$, formed in the wild-cat wheels K, and the pawl-wheels J, the points or extremities of the arms $k^6$ may lie within the angles of the locking-pieces $k$, as shown Fig. 8; but when the pins or locking-pieces $k$ have been inserted into the holes $k^1$, for the purpose of locking together the wild-cat wheels K and the pawl-wheels J, the arms $k^5$ may be turned into the position shown by dotted lines in Fig. 8, so as to securely prevent the withdrawal of the pins or locking-pieces $k$ until the arms $k^5$ have been again turned into the position shown by full lines in Fig. 8.

In order to regulate the paying out of the anchor-chains, or to stop them when required, the friction-bands $K^2$ encircling the wild-cat wheels K are operated by means of handspikes $K^3$, thereby regulating the revolution of the wheels K as required, or stopping them altogether. If desired, the plates $N^1$ of the chain-stopper N may then be closed, which will also have the effect of stopping the paying out of the anchor-chains.

In order to ascertain the number of fathoms of chain paid out in the casting or heaving of the anchors, the wild-cat-head wheels K, in revolving, set in motion the eccentric R, fastened thereto; the eccentric R, by means of the lever-arm $r^2$, pitman $r^5$, lever $r^6$, and driver $r^7$, pushes the ratchet-wheel S mounted in front of the dial T. By preference, at every seventh turn of the screw F, and at every revolution of the wild-cat-head wheels, the driver $r^7$ pushes the ratchet-wheel S and the hand $S^2$ a distance equal to one division of the dial T, and as each division indicates a fathom, the number of fathoms the anchor-chain has been paid out or heaved is correctly shown. When it is desired to heave the anchors the wild-cat-head wheels K are locked up to the pawl-wheels J, by means of the locks or keys $k$; handspikes $K^{10}$ are then set in the holes of the drum-head $d^4$ of the capstan D; the device is then operated to the right hand, revolving the spindle or shaft E, and the endless screw F, which gears into the worm-wheel G, and by means of the wheels K, which are connected with the windlass-shaft H by means of the locks or keys $k$, causing the chain-links to pass over the grabs of the wheels K, by which means they are kept from going backward, and are conducted forward to the chain-locker. The independent capstan D is employed when the ship is being towed by another, or for hauling to a wharf. When it is desired to heave up masts or other heavy wieghts, the wild-cat-head wheels $k$ are unlocked and set free, handspikes are set in the drum-head $d^4$ of the capstan D, which is then turned to the right, thereby setting the windlass B in motion. A rope is then passed two or three times over the barrel-wheels I, the end of said rope being held taut by sailors, and by these means the weight is heaved up. In order to reverse the motion of the windlass to the left hand, the pawl-lever Q is lowered and checked by the pin $Q^4$, thereby raising the pawls $J'$, and disconnecting the same from the pawl-wheels J, thereby leaving the windlass free to move in either direction.

Having thus described my invention, what I claim, and desire to secure by Letters Patent, is—

1. The combination, with the shaft E of a capstan provided with an endless screw, F, capable of working to the right hand, of a windlass, having a pawl-lifter, Q, shaft $Q^1$, arms $Q^2$, and a series of pawls, $J'$, substantially as and for the purpose described.

2. The combination, with a windlass, of the pawl-lifter lever Q, shaft $Q^1$, arms $Q^2$, and a series of pawls, $J'$, substantially as and for the purpose described.

3. The combination, with a windlass, of a dial or indicating means so arranged as to represent the number of fathoms of rope or chain passed around the same, substantially as set forth.

4. The combination, with a windlass, of an eccentric, R, operating a series of levers and a ratchet-weeel in such a manner as to cause a pointer or hand to indicate on a dial the number of feet or fathoms of rope or chain paid out or heaved up, substantially as set forth.

5. The combination of the dials T, ratchet-wheels S, indicators or hands $S^2$, drivers $r^7$, levers and arms $r^6$, $r^5$, $r^2$, rods $r$, and eccentrics R, with the wild-cat-head wheels K K of a windlass, substantially as and for the purpose set forth.

6. The combination, with a windlass, B, dials T, rachet-wheels S, indicators or hands $S^2$, drivers $r^7$, levers and arms $r^6$, $r^5$, $r^2$, rods $r$, and eccentrics R, of the chain-stoppers N, having hinged plates $N^1$ and cam-levers $N^2$, substantially as and for the purpose described.

7. In a windlass or hoisting apparatus, the combination, with the wheels K and J, of the pins or locking-pieces $k$, having shafts $k^3$, provided with arms $k^6$, substantially as and for the purpose described.

In testimony that I claim the foregoing as my own, I affix my signature in presence of two witnesses.

PIERRE C. ST. MARIE.

Witnesses:
COLBORNE BROOKES,
E. W. FARLEIGH.